United States Patent
Lin

(10) Patent No.: US 10,262,558 B2
(45) Date of Patent: Apr. 16, 2019

(54) CELESTIAL GLOBE ASSEMBLY

(71) Applicant: Yenkuang Lin, New Taipei (TW)

(72) Inventor: Yenkuang Lin, New Taipei (TW)

(*) Notice: Subject to any disclaimer, the term of this patent is extended or adjusted under 35 U.S.C. 154(b) by 164 days.

(21) Appl. No.: 15/495,087

(22) Filed: Apr. 24, 2017

(65) Prior Publication Data

US 2017/0294147 A1    Oct. 12, 2017

Related U.S. Application Data

(63) Continuation-in-part of application No. 29/560,702, filed on Apr. 8, 2016, now Pat. No. Des. 785,092.

(30) Foreign Application Priority Data

Oct. 4, 2016  (WO) .................... DM/093 016
Dec. 21, 2016 (TW) .................... 105219403 U
Feb. 10, 2017 (CN) .................... 2017 2 0125981 U

(51) Int. Cl.
   *G09B 27/06* (2006.01)
   *G09B 27/04* (2006.01)

(52) U.S. Cl.
   CPC ............ *G09B 27/06* (2013.01); *G09B 27/04* (2013.01)

(58) Field of Classification Search
   USPC ............... 434/111, 131, 135, 143, 285–289
   See application file for complete search history.

(56) References Cited

U.S. PATENT DOCUMENTS

| | | | | |
|---|---|---|---|---|
| 501,136 A * | 7/1893 | Gregory | ............... | G09B 27/02 434/288 |
| 2,402,194 A * | 6/1946 | Wolfe | ............... | G01C 21/02 434/287 |
| 2,460,346 A * | 2/1949 | Hagner | ............... | G01C 21/02 33/1 SA |
| 2,515,401 A * | 7/1950 | Dupler | ............... | G09B 27/08 434/288 |
| 3,303,582 A * | 2/1967 | Farquhar | ............... | G09B 27/02 434/288 |
| 3,863,364 A * | 2/1975 | King | ............... | G09B 27/04 434/287 |
| 3,997,980 A * | 12/1976 | Rogers | ............... | G09B 27/08 434/141 |
| 4,141,157 A * | 2/1979 | Maldacker | ............... | G09B 27/06 434/286 |
| 4,702,703 A * | 10/1987 | Herbst | ............... | G09B 27/06 434/287 |
| 4,970,793 A * | 11/1990 | Atamian | ............... | G01C 17/34 33/268 |
| 4,971,559 A * | 11/1990 | Amano | ............... | G09B 27/08 434/131 |

(Continued)

*Primary Examiner* — Kurt Fernstrom
(74) *Attorney, Agent, or Firm* — Ude Lu; Cozen O'Connor

(57) ABSTRACT

A celestial globe assembly includes a celestial body pointing pen. The celestial body pointing pen includes a light emitting mechanism. The celestial body pointing pen includes a reference marking at a bottom end. The celestial globe assembly includes a celestial globe. The celestial globe includes a spherical body. The spherical body has at least one star marking on a surface of the spherical body. The celestial globe assembly includes a celestial body recording cover. The celestial body recording cover is in semi-spherical shape. The celestial body recording cover is at least partially transparent such that a user can see through.

20 Claims, 6 Drawing Sheets

(56) References Cited

U.S. PATENT DOCUMENTS

| | | | | |
|---|---|---|---|---|
| 5,033,965 A | * | 7/1991 | Chiu | G09B 27/08 434/131 |
| 5,280,458 A | * | 1/1994 | Scott | G04B 19/226 368/24 |
| 5,344,325 A | * | 9/1994 | Wang | G09B 27/02 368/16 |
| 6,068,486 A | * | 5/2000 | Frank | G09B 27/08 434/130 |
| 6,183,257 B1 | * | 2/2001 | Ho | G09B 27/08 362/809 |
| 6,221,457 B1 | * | 4/2001 | Rasmussen | G09B 27/08 40/615 |
| 6,979,197 B2 | * | 12/2005 | Cho | G09B 27/06 434/136 |
| 7,207,803 B2 | * | 4/2007 | Wilson | G09B 27/08 434/131 |

* cited by examiner

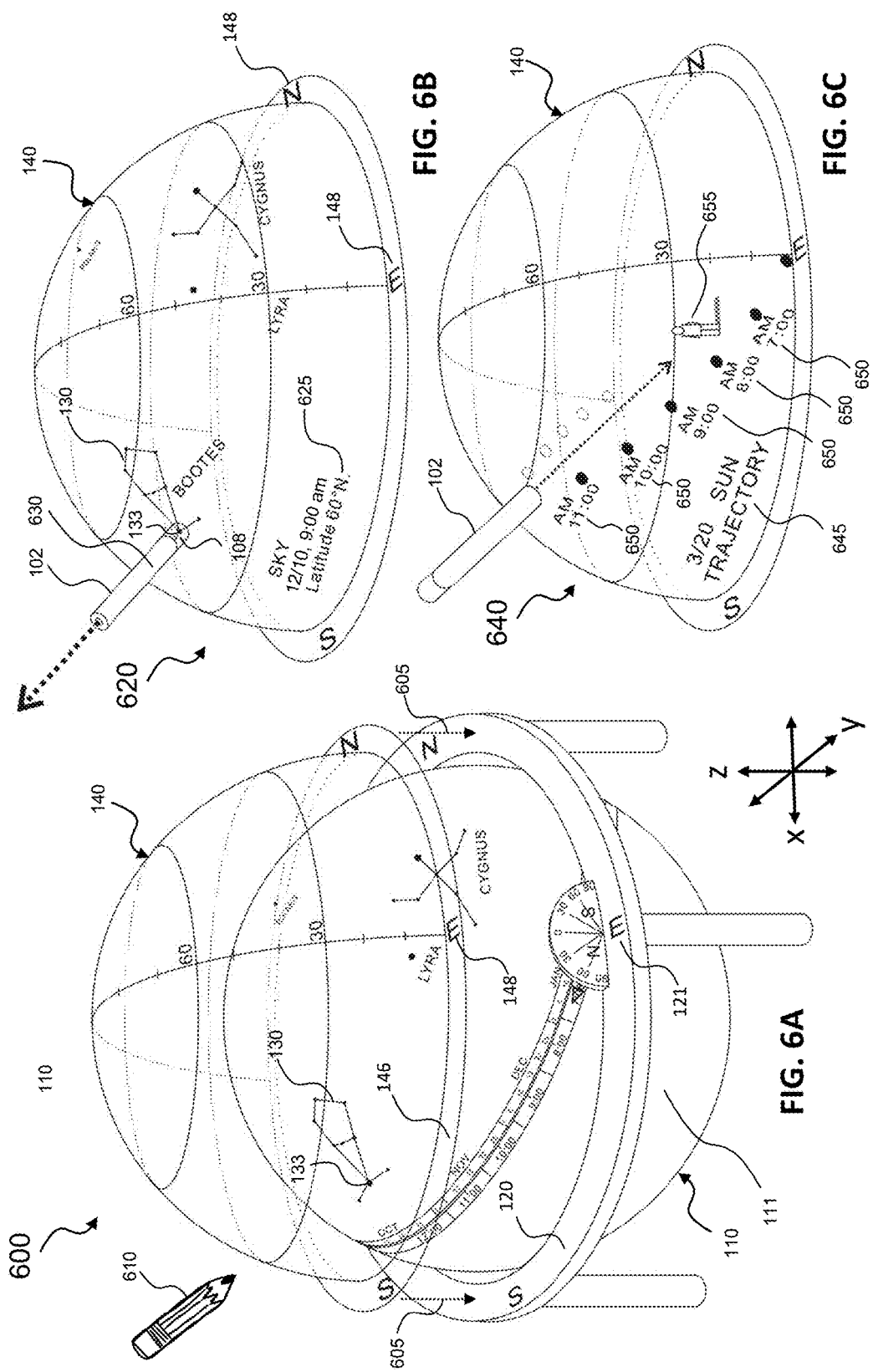

CELESTIAL GLOBE ASSEMBLY

This application is a continuation-in-part application of U.S. Design patent application Ser. No. 29/560,702, filed on Apr. 8, 2016. This application claims priority to Taiwan Application No. TW105219403, filed on Dec. 21, 2016. This application claims priority to China Application No. CN201720125981.1, filed on Feb. 10, 2017. This application claims priority to International Design Registration No. DM 093 016, registered on Oct. 4, 2016. The contents of the aforementioned applications are incorporated herein in their entirety for all purposes.

FIELD OF THE INVENTION

The disclosure relates to a celestial globe assembly. More specifically, the disclosure relates to an assembly of a celestial globe that includes a celestial globe, a celestial body pointing pen, and a celestial body recording cover.

BACKGROUND OF THE INVENTION

The movements of the celestial bodies, including stars, sun, and moon, determines the day-and-night, the seasons, and the weathers on earth. The understanding of the movements of the celestial bodies is a complex art that requires years of studies.

There is currently no instrument that can demonstrate the movements of celestial bodies in an intuitive manner. The embodiments disclosed herein aim to provide instruments and methods thereof designed to demonstrate the celestial bodies and their movements in an intuitive manner. The instruments and methods disclosed herein may be used for educational and entertaining purposes.

SUMMARY

The disclosure relates to a celestial globe assembly. More specifically, the disclosure relates to an assembly of a celestial globe that includes a celestial globe, a celestial body pointing pen, and a celestial body recording cover.

According to one embodiment of the disclosure, a celestial globe assembly includes a celestial body pointing pen. The celestial body pointing pen includes a light emitting mechanism. The celestial body pointing pen includes a reference marking at a bottom end. The celestial globe assembly includes a celestial globe. The celestial globe includes a spherical body. The spherical body has at least one star marking on a surface of the spherical body. The celestial globe assembly includes a celestial body recording cover. The celestial body recording cover is in a semi-spherical shape. The celestial body recording cover is at least partially transparent such that a user can see through. The celestial body recording cover is configured to cover half of the spherical body of the celestial globe. The reference marking of the celestial body pointing pen is configured to overlap with the at least one star marking on the surface of the spherical body.

According to one embodiment of the disclosure, a method of using a celestial globe assembly, comprising turning a spherical body of a celestial globe about a first axis; matching a first date of a date bend with a first time of a time bend; turning the spherical body of the celestial globe about a second axis; matching a celestial equator with a predetermined latitude shown on a latitude disk; and orienting the celestial globe such that directional markings of the celestial globe matches the geographical directions.

BRIEF DESCRIPTION OF THE DRAWINGS

The following drawings form part of the present specification and are included to further demonstrate certain aspects of the disclosure. The disclosure may be better understood by reference to one or more of these drawings in combination with the detailed description of the specification embodiments presented herein.

FIG. 6A is a method of using a celestial globe assembly according to one embodiment of the disclosure.

FIG. 6B is a method of using a celestial globe assembly according to one embodiment of the disclosure.

FIG. 6C is a method of using a celestial globe assembly according to one embodiment of the disclosure.

DETAILED DESCRIPTION

Figure 1:
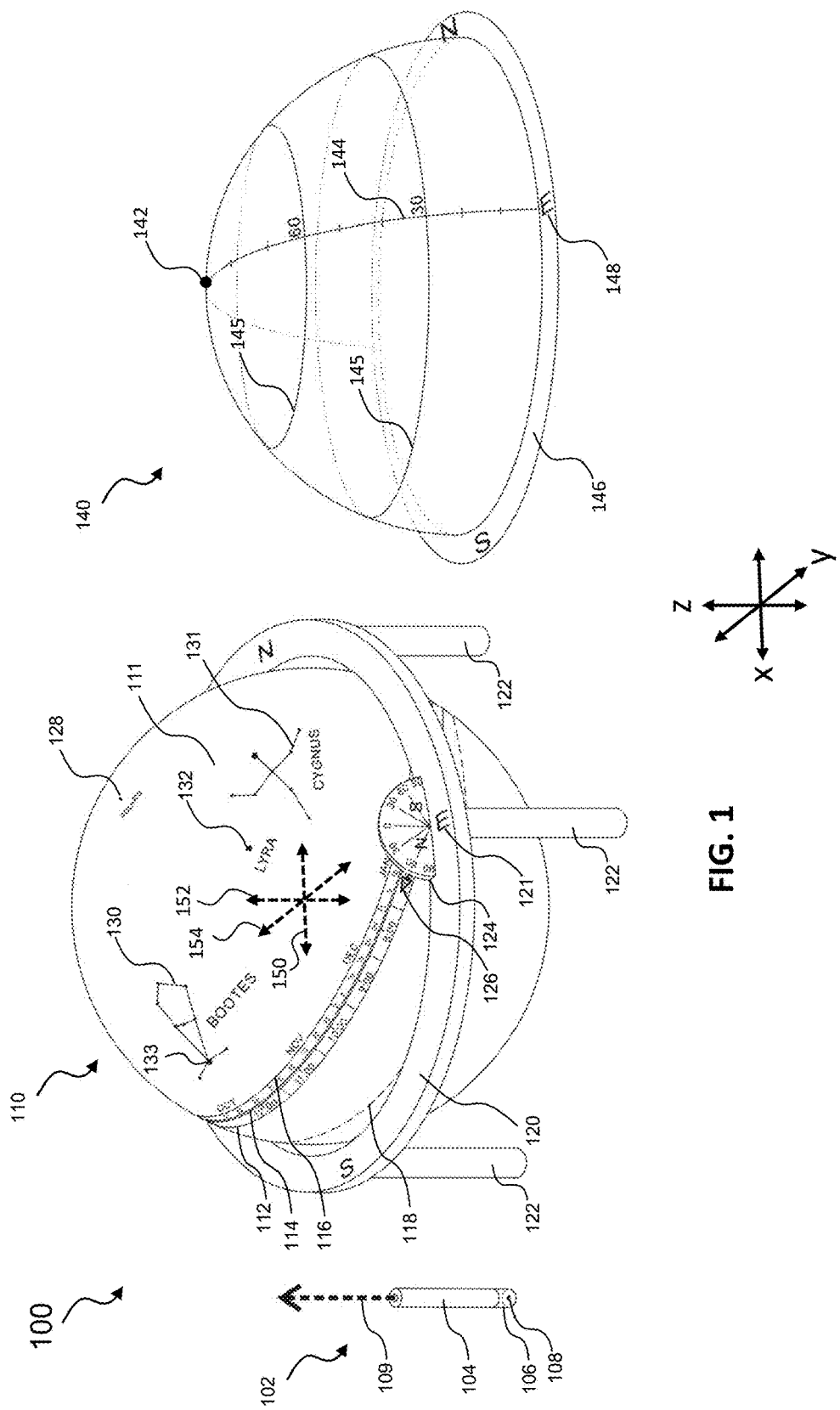
FIG. 1 is a celestial globe assembly according to one embodiment of the disclosure.

The following includes definitions of various terms and phrases used throughout this specification.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Other objects, features and advantages of the present disclosure will become apparent from the following figures, detailed description, and examples. It should be understood, however, that the figures, detailed description, and examples, while indicating specific embodiments of the disclosure, are given by way of illustration only and are not meant to be limiting. Additionally, it is contemplated that changes and modifications within the spirit and scope of the disclosure will become apparent to those skilled in the art from this detailed description.

The term "earth equator" means the great circle around the earth that is everywhere equidistant from the geographic poles and lies in a plane perpendicular to the earth's axis. This geographic, or terrestrial, equator divides the earth into the northern and southern hemispheres and forms the imaginary reference line on the earth's surface from which latitude is reckoned; in other words, it is the line with 0° latitude.

The term "horizon" means the plane with 0° latitude that separates the earth into north and south hemispheres. "Horizontal plane" is the plane defined by the horizon.

"Altitude" is the angular elevation from the horizon plane.

"Geographic north pole" means the north pole of earth.

"Geographic south pole" means the south pole of earth.

The term "earth's axis" means the rotational axis of earth's self-rotation. The earth's axis passes through the geographic north pole and south pole.

"Celestial sphere" is an imaginary sphere of arbitrarily large radius, concentric with Earth. Celestial sphere can also be understood as an imaginary sphere of which the observer is the center and on which all celestial bodies are considered to lie. All celestial bodies in the observer's sky can be thought of as projected upon the inside surface of the celestial sphere, as if it were the underside of a dome or a hemispherical screen.

The term "celestial equator" means the great circle is equidistant from the celestial poles. The celestial equator lies in the celestial equator plane.

The "celestial equator plane" is the plane that separates the celestial sphere into a north hemisphere and a south hemisphere.

The "north celestial pole" is the north pole of the celestial sphere.

The "south celestial pole" is the south pole of the celestial sphere.

The "ecliptic" is the apparent path of the Sun on the celestial sphere.

Unless defined otherwise, all technical and scientific terms used herein have the same meanings as commonly understood by one of ordinary skill in the art to which this disclosure belongs. All publications and patents specifically mentioned herein are incorporated by reference in their entirety for all purposes including describing and disclosing the chemicals, instruments, statistical analyses and methodologies which are reported in the publications which might be used in connection with the disclosure. All references cited in this specification are to be taken as indicative of the level of skill in the art. Nothing herein is to be construed as an admission that the disclosure is not entitled to antedate such disclosure by virtue of prior disclosure.

These and other non-limiting aspects of the present disclosure are discussed in further detail in the following paragraphs.

FIG. 1 is a celestial globe assembly 100 according to one embodiment of the disclosure. The celestial globe assembly 100 can be used in combination with the sticker set 200 in FIG. 2 and sticker set 300 in FIG. 3. The celestial globe assembly 100 can be used in method 400 in FIG. 4, method 500 in FIG. 5, method 600 in FIG. 6A, method 620 in FIG. 6B, and method 640 in FIG. 6C.

As shown in FIG. 1, the celestial globe assembly 100 (hereinafter "assembly") includes a celestial body pointing pen 102 (hereinafter "pointing pen"), a celestial globe 110, and a celestial body recording cover 140 (hereinafter "recording cover").

The pointing pen 102 includes a pen body 104, a transparent base 106, and a reference marking 108. The pen body 104 is an elongated cylindrical body. The pen body 104 may include light emitting mechanisms, e.g., laser light emitting diodes, solid state light source, light emitting diode, etc. The pen body 104 may include one or more lens configured to orient the light emitted by the light emitting mechanisms to form a focused light beam 109, e.g., laser beam.

The pointing pen 102 includes a transparent base 106. The transparent base 106 is made with one or more materials that are at least partially transparent. The transparent base 106 can be made with appropriate plastics or glass materials. The transparent base 106 is configured such that the user may see the reference marking 108 through the transparent base. Being able to see the reference marking 108 through the transparent base 106 makes it convenient for the user to overlap the reference marking 108 with a celestial body, e.g., a star, on the celestial globe 110 of interest. The bottom surface of the transparent base 106 where the reference marking 108 is disposed may be a concaved surface that has the curvature matching with the surface of the celestial globe 110, such that when the transparent base 106 is in physical contact with the surface of the celestial globe 110, the pointing pen 102 does not wobble.

The assembly 100 includes a celestial globe 110. The celestial globe 110 includes a spherical body 111. The celestial globe 110 includes a horizontal plate 120 and a plurality of stands 122 connected to the horizontal plate 120.

The horizontal plate 120 represents the horizon of the earth with 0° latitude that separates the earth into north and south hemispheres. The top surface of the horizontal plate 120 represents the horizontal plane. The horizontal plate 120 includes directional markings 121, wherein "E" means geographical east direction, "W" means geographical west direction, "N" means geographical north direction, and S means geographical south direction.

As shown in FIG. 1, NS axis 150 is a rotational axis that passes through the N and S markings of the horizontal plate 120. WE axis 154 is a rotational axis that passes through the W and E markings of the horizontal plate 120. Zenith axis 152 is a rotational axis that intersects with the NS axis 150 and the WE axis 154. In addition, the zenith axis 152 is perpendicular to the horizontal plane. NS axis 150, WE axis 154, and zenith axis 152 are perpendicular to each other.

As shown in FIG. 1, the horizontal plane is parallel to the XY plane. NS axis 150 is parallel to x axis. Zenith axis 152 is parallel to z axis. WE axis is parallel to y axis. The x axis, y axis, and z axis are known to an ordinary personal of skill in the art as three dimensional vectors orthogonal to each other.

The spherical body 111 represents the celestial sphere. The spherical body 111 is a sphere of arbitrarily large radius, concentric with earth. An imaginary earth or imaginary observer is the center of the spherical body 111. The spherical body 111 can also be understood as a sphere of which the observer is the center and on which all celestial bodies are considered to lie.

The spherical body 111 includes markings of celestial bodies, such as constellations and stars. As show in FIG. 1, the markings of celestial bodies include Bootes 130 and Cygnus 131. As shown in FIG. the markings of celestial bodies include Lyra 132 and Polaris 128. In some embodiments, the markings of celestial bodies can be printed or engraved on the surface of the spherical body 111.

The zenith axis 152 and the WE axis 154 are both rotational axes of the spherical body 111. However, NS axis is not a rotational axis of the spherical body 111. In other words, the spherical body 111 may rotate about the WE axis 154 and zenith axis 152 simultaneously. But the spherical body 111 does not rotate about the NS axis 150.

The spherical body 111 further includes a date bend 116. The date bend 116 is printed or engraved on the surface of the spherical body 111. Thus, when the spherical body 111 rotates, the date bend 116 also rotates. The date bend 116 does not make relational movement in regard to the marking of celestial bodies, because both the date bend 116 and the marking of celestial bodies (e.g., Bootes 130, Polaris 128) are printed or engraved on the surface of the spherical body 111.

The date bend 116 is circumferentially disposed around the spherical body 111. The date bend 116 includes markings of the twelve months, e.g., January, February, March, . . . October, November, December. The date bend 116 also includes dates within each month. In one embodiment, the date bend 116 may include every single date of the month, and therefore includes 365 days of a year. In one embodiment, the date bend 116 may include markings of every 5 days within a month.

The date bend 116 has two sides: a top side and a bottom side. The top side of the date bend 116 is proximal to the north celestial pole. The bottom side of the date bend 116 overlaps with the celestial equator 114.

The spherical body 111 includes a marking of ecliptic 118.

The celestial globe 110 includes a time bend 112. The time bend 112 is a separate structure from the spherical body 111. The time bend 112 rotates only about the WE axis 154. The time bend 112 does not rotate about the NS axis 150 or the zenith axis 152. The time bend 112 includes markings for the 24 hours of a day.

The time bend 112 has a top side and a bottom side. In one embodiment, the top side of the time bend 112 overlaps with the celestial equator 114. In one embodiment, the top side of the time bend 112 is proximal to the north celestial pole. In one embodiment, the bottom side of the time bend 112 is proximal to the south celestial pole.

The celestial globe 110 includes a latitude disk 124. The latitude disk 124 is semicircular. As shown in FIG. 1, the latitude disk 124 includes latitude marking which start, in a clockwise direction, from 90° at horizon plane to 0° at zenith direction, representing the north hemisphere latitudes. Further, as shown in FIG. 1, the latitude marking continues, in a clockwise direction, from 0° at zenith direction to 90° back to the horizon plane, representing the south hemisphere latitudes.

The celestial globe 110 includes a latitude indicator 126. The latitude indicator 126 indicates what latitude the celestial equator 114 is currently at. In one embodiment, the latitude indicator 126 always points at the celestial equator 114. When the spherical body 111 rotates about the WE axis 154, the latitude indicator 126 follows the celestial equator 114. Thus, by observing the latitude indicator 126, a user can understand what latitude the celestial equator 114 is currently at.

The celestial globe assembly 100 includes a celestial body recording cover 140 (hereinafter "recording cover"). In one embodiment, the recording cover 140 is made with transparent material.

The recording cover 140 includes a zenith 142. The recording cover includes a horizontal plate 146. The horizontal plate 146 represents the horizon of the earth with 0° latitude that separates the earth into north and south hemispheres. The top surface of the horizontal plate 146 represents the horizontal plane. The horizontal plate 146 includes directional markings 148, wherein "E" means geographical east direction, "W" means geographical west direction, "N" means geographical north direction, and "S" means geographical south direction.

In one embodiment, the horizontal plate 146 can match with the horizontal plate 120, as well as the markings thereof.

In one embodiment, the horizontal plate 146 can have one or more magnets and the horizontal plate 120 may also have corresponding magnets, such that when the two horizontal plates 146 and 120 are attached to each other, the orientations of the two horizontal plates 146 and 120 can be automatically self-aligned.

The recording cover 140 includes altitude markings 144. The altitude markings 144 indicate the elevated angle from the horizon plane defined by the horizontal plate 146.

The recording cover 140 further includes a plurality of circular markings of altitudes 145. A circular marking of altitude 145 is a circular marking on the recording cover 140 to show every point on the cover with the same altitude.

Figure 2:
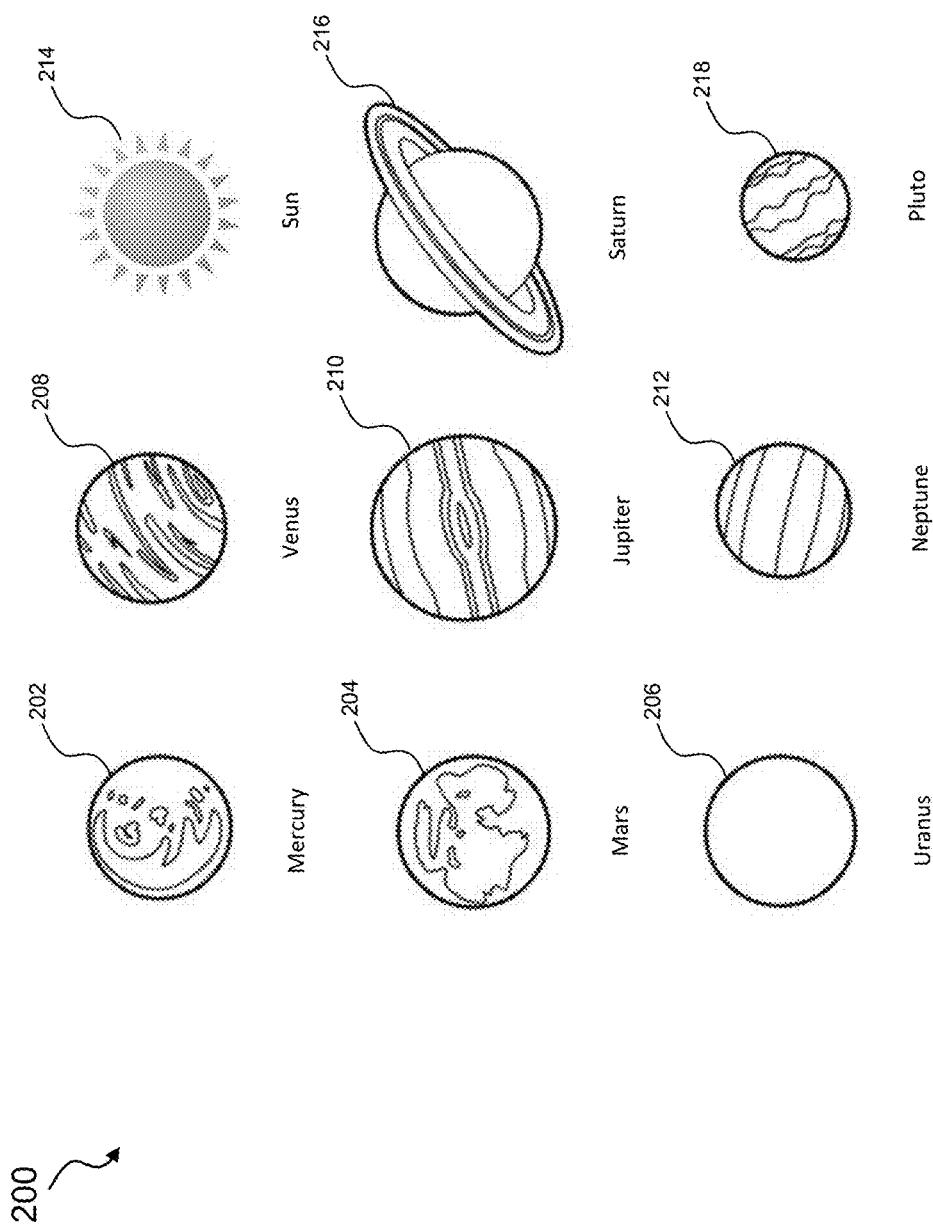
FIG. 2 is a sticker set of celestial bodies according to one embodiment of the disclosure.

FIG. 2 is a sticker set 200 of celestial bodies according to one embodiment of the disclosure. The sticker set 200 includes a sticker of Mercury 202, a sticker of Mars 204, a sticker of Uranus 206, a sticker of Venus 208, a sticker of Jupiter 210, a sticker of Neptune 212, a sticker of Sun 214, a sticker of Saturn 216, and a sticker of Pluto 218.

Any sticker of the set 200 can be attached to the spherical body 111. In one embodiment, any sticker of the set 200 can be removably attached to the spherical body 111.

In astronomy, Mercury, Mars, Uranus, Venus, Jupiter, Neptune, Sun, Saturn, and Pluto make relative movements to the stars, e.g., the celestial body printed on the spherical body 111. Therefore, to know the exact position of Mercury, Mars, Uranus, Venus, Jupiter, Neptune, Sun, Saturn, or Pluto on the celestial sphere on a certain date and time in relation to the stars, a user has to check some readily available table or software to find out the celestial latitude and celestial longitude of interest. Once the celestial latitude and celestial longitude of interest is obtained from the table or software, a user can stick the appropriate sticker (Mercury 202, Mars 204, Uranus 206, Venus 208, Jupiter 210, Neptune 212, Sun 214, Saturn 216, or Pluto 218) picked from the sticker set 200 on the spherical body 111 to the appropriate position.

Figure 3:
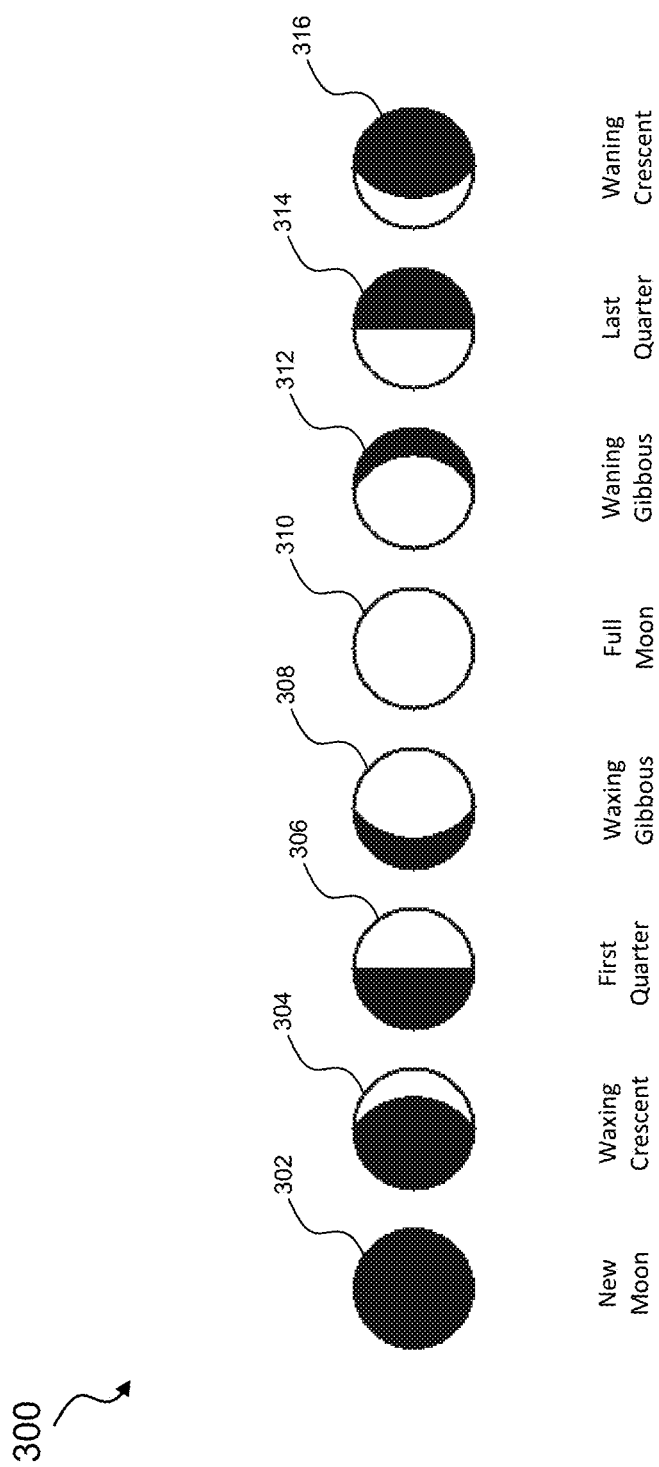
FIG. 3 is a sticker set of moons according to one embodiment of the disclosure.

FIG. 3 is a sticker set 300 of moons according to one embodiment of the disclosure. The sticker set 300 includes a sticker of new moon 302, a waxing crescent 304, a first quarter 306, a waxing gibbous 308, a full moon 310, a waning gibbous 312, a last quarter 314, a waning crescent 316.

In astronomy, the moon makes relative movements to the stars, e.g., the celestial body printed on the spherical body 111. Therefore, to know the exact position of the moon on the celestial sphere on a certain date and time in relation to the stars, a user has to check some readily available table or software to find out the celestial latitude and celestial longitude of interest. Once the celestial latitude and celestial longitude of interest is obtained from the table or software, a user can stick the appropriate sticker (new moon 302, a waxing crescent 304, a first quarter 306, a waxing gibbous 308, a full moon 310, a waning gibbous 312, a last quarter 314, a waning crescent 316) picked from the sticker set 300 on the spherical body 111 to the appropriate position.

Figure 4:
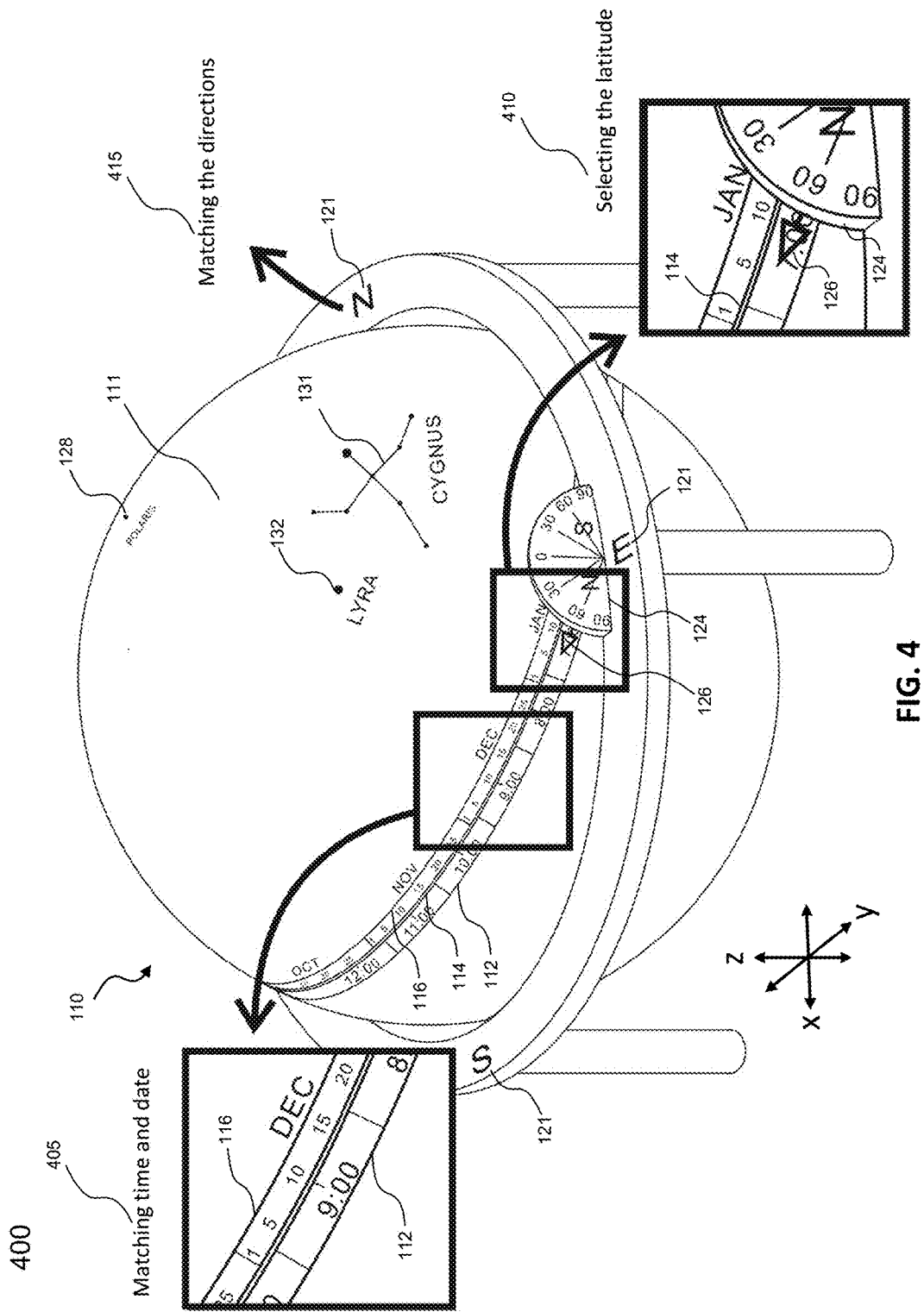
FIG. 4 is a method of using a celestial globe assembly according to one embodiment of the disclosure.

FIG. 4 is a method 400 of using the celestial globe 110 according to one embodiment of the disclosure.

The method 400 includes a step of matching the time and date 405. The step of 405 may include turning the spherical body 111 so that a first date of the date bend 116 matches with a first time of the time bend 112. The step of 405 may include turning the spherical body 111 about the zenith axis 152 (parallel to z axis) so that a first date of the date bend 116 matches with a first time of the time bend 112.

For example, as shown in FIG. 4, a first date may be December 10, and the first time may be 9:00 am. Therefore, a user may turn the spherical body 111, such that December 10 of the date bend 116 matches with the time 9:00 am of the time bend 112.

The method 400 includes a step of selecting the latitude 410. The step of 410 may include turning the spherical body 111 and the time bend 112 together about the WE axis 154 (parallel to y axis) such that the celestial equator 114 and the latitude indicator 126 are both lined up with a first latitude. In one embodiment, the first latitude is the latitude where the observer located a latitude of interest.

For example, as shown in FIG. 4, the first latitude can be 60°, north hemisphere. Thus, a user may turn the spherical body 111 and the time bend 112 together about the WE axis 154 (parallel to y axis) such that the celestial equator 114 and the latitude indicator 126 are both lined up with the 60°, north hemisphere marking on the latitude disk 124.

The method 400 includes a step of matching the directions 415. The step 415 includes orienting the celestial globe 110 such that the directional markings 121 match with the geographical directions.

In one embodiment, the step 415 includes matching "E" 121 of the celestial globe 110 to the geographical east direction, and/or matching "W" 121 of the celestial globe 110 to the geographical west direction, and/or matching "N" 121 of the celestial globe 110 to the geographical north direction, and/or matching "S" 121 of the celestial globe 110 to the geographical south direction.

After completing the steps of 405, 410, and 415, the celestial globe 110 now presents the sky of the specific date (e.g., December 10) at the specific time (e.g., 9 am) at the latitude where the observer is located (e.g., latitude 60°, north hemisphere) in the right directions. It is noted that the steps 405, 410, and 415 have no particular order and the order of the steps can be changed without departing from the scope of the method 400.

Figure 5:
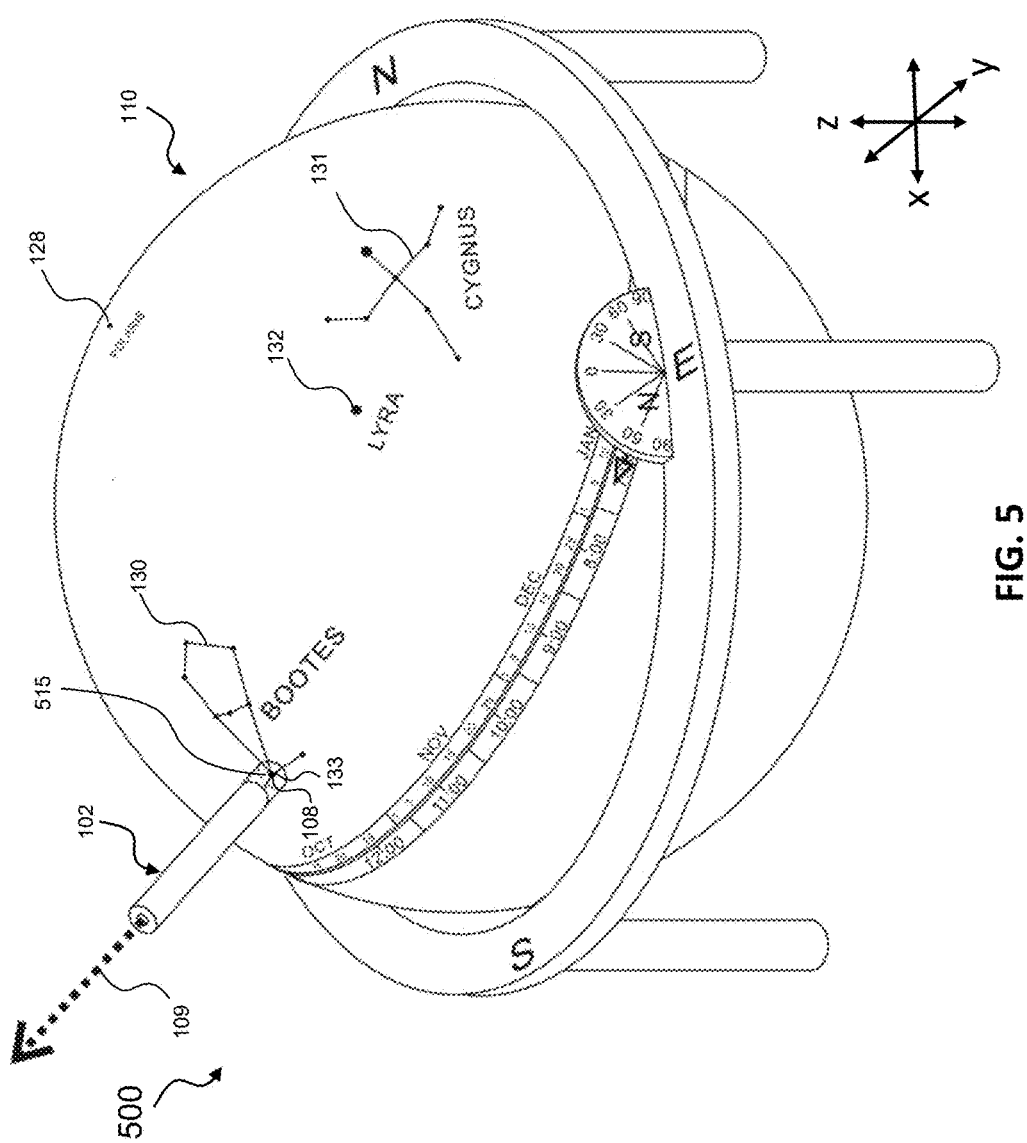
FIG. 5 is a method of using a celestial globe assembly according to one embodiment of the disclosure.

FIG. 5 is a method 500 of using a celestial globe assembly 100 according to one embodiment of the disclosure. Method 500 allows the user to use the star pointing pen 102 to show the actual location of the star of interest in the sky. FIG. 5 shows the star of interest is, for example, the Arcturus 133 (a star) of the Bootes 130 (constellation).

The method 500 may include a step 515 of overlapping the reference marking 108 of the pointing pen 102 to a star of interest. The method 500 may further include releasing the light beam 109 to point to the sky.

Recall from method 400, after the steps of 405, 410, and 415 are done, the celestial globe 110 now presents the sky of the specific date (e.g., December 10) at the specific time (e.g., 9:00 am) at the latitude where the observer is located (e.g., latitude 60°, north hemisphere) in the right directions. Method 500 allows the user to use the star pointing pen 102 to point to the actual location of the star of interest in the sky (e.g., Arcturus 133 of the Bootes 130, as shown in FIG. 5) on the specific date (e.g., December 10) at the specific time (e.g., 9:00 am) at the specific latitude where the observer is located (e.g., latitude 60°, north hemisphere).

FIG. 6A is a method 600 of using a celestial globe assembly 100 according to one embodiment of the disclosure.

The method 600 includes a step 605 of covering the celestial globe 110 with the recording cover 140. The step of 605 may include overlapping the horizontal plate 146 of the recording cover 140 on top of the horizontal plate 120 of the celestial globe 110. The step of 605 may include matching the directional markings 148 of the horizontal plate 146 to the directional markings 121 of the horizontal plate 120.

The method 600 includes a step 610 of marking the recording cover 140 with a marker pen. The step 610 may include marking the position of a star of interest on the recording cover 610 with a marker pen. Because the recording cover 140 is transparent, a user may see through the cover 140. The user is able to use a marker pen to draw or mark-up the recording cover of the position of a star of interest. For example, a user may be interested in the Arcturus 133 of the Bootes 130. The user may then at step 610 mark the position of the Arcturus 133 on the recording cover 140 with the marker pen.

FIG. 6B is a method 620 of using a celestial globe assembly 100 according to one embodiment of the disclosure.

Recall from method 400, after the steps of 405, 410, and 415 are done, the celestial globe 110 now presents the sky of the specific date (e.g., December 10) at the specific time (e.g., 9:00 am) at the latitude where the observer is located (e.g., latitude 60°, north hemisphere) in the right directions. If method 600 is performed after the method 400, and assuming Bootes 130, Cygnus 131, and Polaris 128 are of interest, then at the step 610, the recording cover 140 will have a plurality of marks of the positions of Bootes 130, Cygnus 131, and Polaris 128 for the date December 10, 9:00 am, latitude 60°, north hemisphere. This sky 625 is shown in FIG. 6B.

The method 620 may include a step 630 of overlapping a reference marking 108 of the star pointing pen 102 with a mark of interest on the recording cover 140. The method 630 may further include orienting the recording cover 140 such that the directional markings 148 matches the right geological directions. The method 630 may further include releasing the light beam of the star pointing pen 102 to point to the position of the star in the sky.

FIG. 6C is a method 640 of using a celestial globe assembly 100 according to one embodiment of the disclosure.

The method 640 includes establishing a trajectory of movements of a celestial body 645. Recall the method of 600 that at least one mark of a star of interest is made on the recording cover.

The step of 645 in establishing the trajectory of a celestial body may include all steps of method 600. The step of 645 may further include turning the spherical body 111 to a next time (e.g., from 9:00 am, to 10:00 am, 11:00 am, etc.). The step of 645 then repeats the steps of method 600. Put in another way, method 640 includes turning the spherical body 111 to a first time, make a first mark of the star at the first time, turn the spherical body 111 to a second time, make a second mark of the star at the second time; so on and so forth until a satisfying trajectory of the star is marked up on the recording cover 640. This trajectory represents the movements of the star across the specific time period.

A trajectory can be made for any celestial body, any star, planet, sun, and/or moon. As shown in FIG. 6C, the Sun's trajectory 650 on March 20th is marked up on the recording cover 140. The Sun's trajectory 650 includes, at least, the Sun's positions at 3/20, 7:00 am, 8:00 am, 9:00 am, 10:00 am, 11:00 am, and the like.

If the trajectory is the sun's movements, then the pointing pen 102 can be used to point inside of the cover to simulate the sundial's shades (or an observer's shade 655) during the specific time period. As shown in FIG. 6C, using the pointing pen 102 and allowing the light beam to pass through a marking of the sun at 10:00 am, March 20 and the observer at the same time, reveals the observer's shade at 10:00 am, March 20. Using the pointing pen 102 and allowing the light beam to pass through a marking of the sun at 11:00 am, March 20 and the observer at the same time, reveals the observer's shade at 11:00 am, March 20. Using the pointing pen 102 and allowing the light beam to pass through a marking of the sun at 12:00 pm, March 20 and the observer at the same time, reveals the observer's shade at 12:00 pm, March 20. So on and so forth. A person skilled in the art would understand, the observer's shade has the same principle as a sundial. Therefore, the sun's trajectory illustrated above can also be used to simulate a sundial at a specific time of a specific date at a specific latitude.

It is noted that the above mentioned embodiments and methods are exemplary and should not be construed to limit the true scope of the claims.

ASPECTS OF EMBODIMENTS

1. An aspect of celestial globe assembly, comprising
   a celestial body pointing pen, the celestial body pointing pen including a light emitting mechanism, the celestial body pointing pen includes a reference marking at a bottom end;
   a celestial globe, the celestial globe including a spherical body, the spherical body having at least one star marking on a surface of the spherical body; and
   a celestial body recording cover, the celestial body recording cover being in semi-spherical shape, the celestial body recording cover being at least partially transparent such that a user can see through,
   wherein the celestial body recording cover is configured to cover half of the spherical body of the celestial globe, the reference marking of the celestial body pointing pen is configured to overlap with the at least one star marking on the surface of the spherical body.
2. The celestial globe assembly of aspect 1, wherein the celestial body pointing pen includes a transparent base, the transparent base is configured such that the reference marking is observable through the transparent base.
3. The celestial globe assembly of aspects 1-2, wherein the light emitting mechanism emits laser light.
4. The celestial globe assembly of aspects 1-3, wherein the celestial globe includes a date bend disposed circumferentially around the spherical body, the date bend has a top side and a bottom side, the top side is proximal to a north celestial pole, the bottom side overlaps with a celestial equator.
5. The celestial globe assembly of aspects 1-4, wherein the celestial globe includes a time bend, wherein the time bend is a separate structure from the spherical body, the time bend includes a top side that overlaps with a celestial equator, the time bend includes a bottom side proximal to a south celestial pole.
6. The celestial globe assembly of aspects 1-5, wherein the celestial globe includes a horizontal plate representing the horizon, the horizontal plate includes directional markings.
7. The celestial globe assembly of aspects 1-6, wherein the celestial globe includes a horizontal plate representing the horizon, at least three stands are attached to a bottom surface of the horizontal plate to provide structural support.
8. The celestial globe assembly of aspects 1-7, wherein the celestial globe includes a latitude disk, the latitude disk is configured to indicate a first latitude of a first sky the spherical body represents.
9. The celestial globe assembly of aspects 1-8, wherein the celestial body recording cover includes altitude markings.
10. The celestial globe assembly of aspects 1-9, wherein the celestial body recording cover includes a horizontal plate, the horizontal plate includes directional markings.
11. An aspect of a method of using a celestial globe assembly, comprising
   turning a spherical body of a celestial globe about a first axis;
   matching a first date of a date bend with a first time of a time bend;
   turning the spherical body of the celestial globe about a second axis;
   matching a celestial equator with a predetermined latitude shown on a latitude disk; and
   orienting the celestial globe such that directional markings of the celestial globe match the geological directions.
12. The method of aspect 11, further comprising
   overlapping a reference marking of a celestial body pointing pen with a star marking of the spherical body; and
   releasing a light beam of the celestial body pointing pen.
13. The method of aspects 11-12, further comprising
   covering the spherical body of the celestial globe with a celestial body recording cover; and
   matching the directional markings of the celestial body recording cover with the directional markings of the celestial globe.
14. The method of aspects 11-13, further comprising
   covering the spherical body of the celestial globe with a celestial body recording cover;
   matching the directional markings of the celestial body recording cover with the directional markings of the celestial globe; and
   marking up a first position of a star on the celestial body recording cover.
15. The method of aspects 11-14, further comprising
   turning the spherical body of the celestial globe about the first axis;
   matching the first date of the date bend with a second time of a time bend; and
   marking up the celestial body recording cover of a second position of the star.
16. The method of aspects 11-15, further comprising
   overlapping a reference marking of a celestial body pointing pen with the marking of the first position of the star on the celestial body recording cover; and
   releasing a light beam of the celestial body pointing pen.
17. The method of aspects 11-16, further comprising
   overlapping the reference marking of the celestial body pointing pen with the marking of the second position of the star on the celestial body recording cover; and
   releasing a light beam of the celestial body pointing pen.
18. The method of aspects 11-17, wherein the celestial globe includes
   a horizontal plate circumferentially disposed about the spherical body, the horizontal plate represents the horizon, the horizontal plate includes the directional markings.
19. The method of aspects 11-18, wherein the celestial globe includes
   a latitude indicator turnably attached to the latitude disk, wherein the latitude indicator shows a latitude the celestial equator being currently at.
20. The method of aspects 11-19, wherein the spherical body of the celestial globe includes
   a marking of Polaris.

What is claimed is:
1. A celestial globe assembly, comprising
   a celestial body pointing pen, the celestial body pointing pen including a light emitting mechanism, the celestial body pointing pen including a reference marking at a bottom end;
   a celestial globe, the celestial globe including a spherical body, the spherical body having at least one star marking on a surface of the spherical body; and
   a celestial body recording cover, the celestial body recording cover being in semi-spherical shape, the celestial body recording cover being at least partially transparent such that a user can see through, wherein the celestial body recording cover is configured to cover half of the spherical body of the celestial globe, the reference marking of the celestial body pointing pen is configured to overlap with the at least one star marking on the surface of the spherical body.

2. The celestial globe assembly of claim 1, wherein the celestial body pointing pen includes a transparent base, the transparent base is configured such that the reference marking is observable through the transparent base.

3. The celestial globe assembly of claim 1, wherein the light emitting mechanism emits laser light.

4. The celestial globe assembly of claim 1, wherein the celestial globe includes a date bend disposed circumferentially around the spherical body, the date bend has a top side and a bottom side, the top side is proximal to a north celestial pole, the bottom side overlaps with a celestial equator.

5. The celestial globe assembly of claim 1, wherein the celestial globe includes a time bend, wherein the time bend is a separate structure from the spherical body, the time bend includes a top side that overlaps with a celestial equator, the time bend includes a bottom side proximal to a south celestial pole.

6. The celestial globe assembly of claim 1, wherein the celestial globe includes a horizontal plate representing the horizon, the horizontal plate includes directional markings.

7. The celestial globe assembly of claim 1, wherein the celestial globe includes a horizontal plate representing the horizon, at least three stands are attached to a bottom surface of the horizontal plate to provide structural support.

8. The celestial globe assembly of claim 1, wherein the celestial globe includes a latitude disk, the latitude disk is configured to indicate a first latitude of a first sky the spherical body represents.

9. The celestial globe assembly of claim 1, wherein the celestial body recording cover includes altitude markings.

10. The celestial globe assembly of claim 1, wherein the celestial body recording cover includes a horizontal plate, the horizontal plate includes directional markings.

11. A method of using a celestial globe assembly, comprising
turning a spherical body of a celestial globe about a first axis;
matching a first date of a date bend with a first time of a time bend;
turning the spherical body of the celestial globe about a second axis;
matching a celestial equator with a predetermined latitude shown on a latitude disk; and
orienting the celestial globe such that directional markings of the celestial globe match the geological directions.

12. The method of claim 11, further comprising
overlapping a reference marking of a celestial body pointing pen with a star marking of the spherical body; and
releasing a light beam of the celestial body pointing pen.

13. The method of claim 11, further comprising
covering the spherical body of the celestial globe with a celestial body recording cover; and
matching the directional markings of the celestial body recording cover with the directional markings of the celestial globe.

14. The method of claim 11, further comprising
covering the spherical body of the celestial globe with a celestial body recording cover;
matching the directional markings of the celestial body recording cover with the directional markings of the celestial globe; and
marking up a first position of a star on the celestial body recording cover.

15. The method of claim 14, further comprising
turning the spherical body of the celestial globe about the first axis;
matching the first date of the date bend with a second time of a time bend; and
marking up the celestial body recording cover of a second position of the star.

16. The method of claim 15, further comprising
overlapping a reference marking of a celestial body pointing pen with the marking of the first position of the star on the celestial body recording cover; and
releasing a light beam of the celestial body pointing pen.

17. The method of claim 16, further comprising
overlapping the reference marking of the celestial body pointing pen with the marking of the second position of the star on the celestial body recording cover; and
releasing a light beam of the celestial body pointing pen.

18. The method of claim 11, wherein the celestial globe includes
a horizontal plate circumferentially disposed around the spherical body, the horizontal plate represents the horizon, the horizontal plate includes the directional markings.

19. The method of claim 11, wherein the celestial globe includes
a latitude indicator turnably attached to the latitude disk, wherein the latitude indicator shows a latitude the celestial equator being currently at.

20. The method of claim 11, wherein the spherical body of the celestial globe includes
a marking of Polaris.

* * * * *